US012742524B1

(12) United States Patent
Li et al.

(10) Patent No.: US 12,742,524 B1
(45) Date of Patent: Sep. 22, 2026

(54) LED LIGHT FOR MICROWAVE OVENS

(71) Applicant: Long Yan De Yu Lighting Co., Ltd., Fujian (CN)

(72) Inventors: Yuanming Li, Fujian (CN); Zunxiang Huang, Fujian (CN); Dehua Huang, Fujian (CN); Xiaoqin Jian, Fujian (CN); Zhansheng Jian, Fujian (CN)

(73) Assignee: LONG YAN DE YU LIGHTING CO., LTD., Fujian (CN)

( * ) Notice: Subject to any disclaimer, the term of this patent is extended or adjusted under 35 U.S.C. 154(b) by 0 days.

(21) Appl. No.: 19/388,963

(22) Filed: Nov. 13, 2025

(51) Int. Cl.

| | |
|---|---|
| ***F21K 9/238*** | (2016.01) |
| ***F21V 29/70*** | (2015.01) |
| ***F21V 33/00*** | (2006.01) |
| ***F21W 131/307*** | (2006.01) |
| ***F21Y 115/10*** | (2016.01) |

(52) U.S. Cl.
CPC .............. *F21K 9/238* (2016.08); *F21V 29/70* (2015.01); *F21V 33/0044* (2013.01); *F21W 2131/307* (2013.01); *F21Y 2115/10* (2016.08)

(58) Field of Classification Search
CPC ....... F21K 9/238; F21V 29/70; F21V 33/0044
See application file for complete search history.

(56) References Cited

U.S. PATENT DOCUMENTS

| | | | | |
|---|---|---|---|---|
| 8,568,001 | B2 * | 10/2013 | Daily | F21V 19/004 362/396 |
| 11,920,742 | B1 * | 3/2024 | Zou | F21K 9/232 |
| 12,203,604 | B1 * | 1/2025 | Lin | F21K 9/232 |
| 12,287,070 | B1 * | 4/2025 | Yu | F21K 9/232 |
| 2002/0149312 | A1 * | 10/2002 | Roberts | F21V 29/54 257/E23.087 |
| 2009/0086436 | A1 * | 4/2009 | Kluge | F21V 29/70 361/707 |
| 2013/0044501 | A1 * | 2/2013 | Rudisill | F21S 2/005 362/398 |
| 2015/0198297 | A1 * | 7/2015 | Ayres | F21L 4/027 362/184 |

* cited by examiner

*Primary Examiner* — Bryon T Gyllstrom
(74) *Attorney, Agent, or Firm* — Leong C. Lei

(57) ABSTRACT

An LED light for microwave ovens includes a base, an LED light strip, and a light housing. The base includes a main body, contact plates on the main body, wires, resistors, and accommodating cavities. The wires are electrically connected to the LED light strip. The main body of the base is connected to the light housing. The contact plates are directly connected to an external power source. The LED light offers advantages such as cost savings in materials, simple assembly processes, concise structure, low manufacturing costs, and ease of automation. It is well-suited for high-frequency microwave environments, making them particularly ideal for illumination inside microwave ovens.

11 Claims, 6 Drawing Sheets

LED LIGHT FOR MICROWAVE OVENS

BACKGROUND OF THE INVENTION

1. Field of the Invention

The present invention relates to the field of household appliance lighting fixtures, and more particularly to an LED light for microwave ovens.

2. Description of the Prior Art

With the rapid advancement of LED technology, lights for microwave ovens have transitioned from tungsten filament lights to LED lights. There are two types of LED lights for microwave ovens. One type uses the traditional tungsten filament light structure that has a glass light housing and a glass core post connected to the light housing as the support for an LED light strip. This type of LED light suffers from issues such as difficult core post processing, cumbersome assembly, fragility, and high manufacturing costs. Another type uses a split-design plastic light housing and a light holder. An LED light chip is built in the light housing. This type of LED light can reduce manufacturing costs and processing difficulty effectively. However, the built-in LED light chip is relatively wide and needs to be secured by both the light housing and the light holder, so the assembly process is still relatively complicated. The LED light chip is powered by DC and needs to be used with a driver. This results in many built-in components in the light housing and is not conducive to cost control.

Existing LED lights may include an assembly of an AC-driven LED light strip, wires and current-limiting resistors to simplify the light structure. On the one hand, this type of LED light still needs a core post on the base to secure the wires. On the other hand, when used in microwave ovens, the current-limiting resistors and wires are exposed to high-frequency microwave environment, making them highly susceptible to becoming inductors with high reactance and losing their current-limiting function. The wires connected to both ends of the resistors may resonate with the microwaves, introducing interference. This may eventually cause the resistors to fail to achieve their current-limiting function, causing the LED light to fail to emit stable illumination and even making it highly susceptible to burnout.

Therefore, how to simplify the structure of LED lights to control production costs while maintaining continuous, stable illumination in high-frequency microwave environments has become an urgent issue requiring resolution.

SUMMARY OF THE INVENTION

The primary object of the present invention is to provide an LED light for microwave ovens, which solves the problems that the conventional LED lights for microwave ovens have numerous parts, complex mounting structures, cumbersome assembly processes, and high manufacturing costs. Besides, when the conventional LED lights are applied to microwave ovens, the resistors are susceptible to high-frequency electromagnetic waves, resulting in poor luminous stability and a short service life.

The present invention is achieved through the following technical solutions:

An LED light for microwave ovens comprises a base, an LED light strip electrically connected to the base, and a light housing connected to the base. The base includes a main body and a pair of contact plates on the main body for connecting an external power source. The contact plates each have a connecting portion attached to an outer surface of the main body. The main body has two guide holes passing through the main body. Each of the guide holes being provided with a wire. One end of the wire is electrically connected to the connecting portion. Another end of the wire extends out of the main body and extends outward to form a bracket. At least one of the guide holes is enlarged either entirely or at one end thereof to form an accommodating cavity. A resistor is provided in the accommodating cavity. The resistor is accommodated and confined within the accommodating cavity. The resistor is connected in series to the wire passing through the accommodating cavity.

Preferably, each of the two guide holes is enlarged either entirely or at the end thereof to form the accommodating cavity. The resistor is disposed in the accommodating cavity and connected in series to the wire. This design creates a more stable connecting bracket by connecting two wires in series with the resistor. This not only enhances the support stability of the base, but also expands the resistor's volume and adjustable resistance range to adapt to different external input voltages and installation spaces.

Preferably, the accommodating cavity is formed by enlarging only the end of the guide hole, close to the connecting portion, and another end of the guide hole is configured for insertion of the wire, thereby forming an isolated accommodating cavity. This can prevent the heat generated by the resistor from being transferred to the light housing after being assembled into an LED light.

Preferably, one end of the resistor is attached to the connecting portion, and the guide hole is in transition fit with the wire. On the one hand, the length of the wire between the resistor and the connecting portion is shortened, thereby shortening the total length of the wire at both ends of the resistor. On the other hand, through the structural limitations of the guide holes and the wires, the absorption of high-frequency microwaves by long wires is weakened, which introduces interference. When used in microwave ovens, the inductive effect of the resistor is reduced, the resistance value is stabilized, and its stable current-limiting function is maintained.

Preferably, one side of the main body, facing away from the contact plates, has an annular boss. A cavity is formed inside the annular boss. A raised block is provided in the cavity and connected to the main body. The guide hole passes through the main body and the raised block. This design utilizes the annular boss and the raised block to extend the length of the guide hole and reduce the thickness of the main body of the base.

Preferably, the contact plates further have retaining legs which are four strip-shaped pieces extending from the connecting portions of the contact plates. The strip-shaped pieces are bent to attach to an inner surface of the main body after passing through the main body. This is beneficial for firm connection and automated assembly.

Preferably, the LED light strip is driven by alternating current (AC). The LED light strip includes connecting terminals at the two ends of the LED light strip and a substrate.

The substrate is provided with two conductive wires connecting light-emitting chips. Two ends of each of the two conductive wires are connected to the connecting terminals through rectifier diodes. The rectifier diodes at the two ends of the same conductive wire are arranged reversely. The rectifier diodes connected to the same connecting terminal are arranged reversely. It can be directly connected to alternating current (AC) without the need for an additional drive device, effectively simplifying the structure inside the light housing and further simplifying the assembly process.

Preferably, the light housing is secured to the base by means of threaded connection or snap-fit connection.

Preferably, the main body of the base is formed with a plurality of first heat dissipation holes, and a top of the light housing is formed with a plurality of second heat dissipation holes. When the temperature inside the light housing rises, convection can be formed inside the light housing through the first heat dissipation holes and the second heat dissipation holes, thereby accelerating heat dissipation.

One of the above technical solutions has the following advantages or beneficial effects:

1. The conventional LED lights for microwave ovens have numerous parts, complex mounting structures, cumbersome assembly processes, and high manufacturing costs. In the present invention, the main body of the base has the guide holes. At least one of the guide holes is enlarged either entirely or at one end thereof to form the accommodating cavity for accommodating and confining the resistor connected in series to the wire. The main body of the base forms a modular base through the coordinated interaction of the contact plates, the wires, the resistor and the accommodating cavity. It can be directly connected to the LED light strip and the light housing as well as an external power source. It effectively simplifies the structure of LED lights for microwave ovens, reduces material costs, features simplified assembly processes, lowers overall costs by 50%, and facilitates automated assembly.
2. When the conventional LED lights are applied to microwave ovens, the resistor and its connecting wires are exposed to high-frequency microwave environment, and they are prone to inductive reactance and resonance, which may cause the resistor value to be unstable, lose the current-limiting function, and affect the light-emitting stability and service life the LED light. In the present invention, the end of the resistor and the connecting portion in the accommodating cavity are as close to each other as possible to shorten the length of the wire between the resistor and the connecting portion, thereby shortening the total length of the wire at both ends of the resistor. Besides, the guide hole is in transition fit with the wire. Through the structural limitation of the guide hole and the wire, the interference introduced by the long wire absorbing microwaves in a high-frequency microwave environment is weakened. When the LED light having the base is applied to microwave ovens, the inductive effect of the resistor is reduced, the resistance value is stabilized, and its stable current-limiting function is maintained. It is beneficial to the stable lighting of LED lights and prolongs their service life.
3. Through the base which integrates retaining support, electrical connection and the function to reduce resistance and high-frequency inductive reactance, the LED light strip and the light housing can be quickly assembled, and the LED light can be quickly installed in microwave ovens. The LED lights feature simple assembly process, short production cycle, low manufacturing cost, simple product structure, easy installation. They are well-suited for high-frequency microwave environments, making them particularly ideal for illumination inside microwave ovens.

BRIEF DESCRIPTION OF THE DRAWINGS

Embodiments of the present invention will now be described, by way of example only, with reference to the accompanying drawings.

DETAILED DESCRIPTION OF THE PREFERRED EMBODIMENTS

The present invention will be further described in detail below with reference to the embodiments, but the embodiments of the present invention are not limited thereto.

First Embodiment

Figure 1:
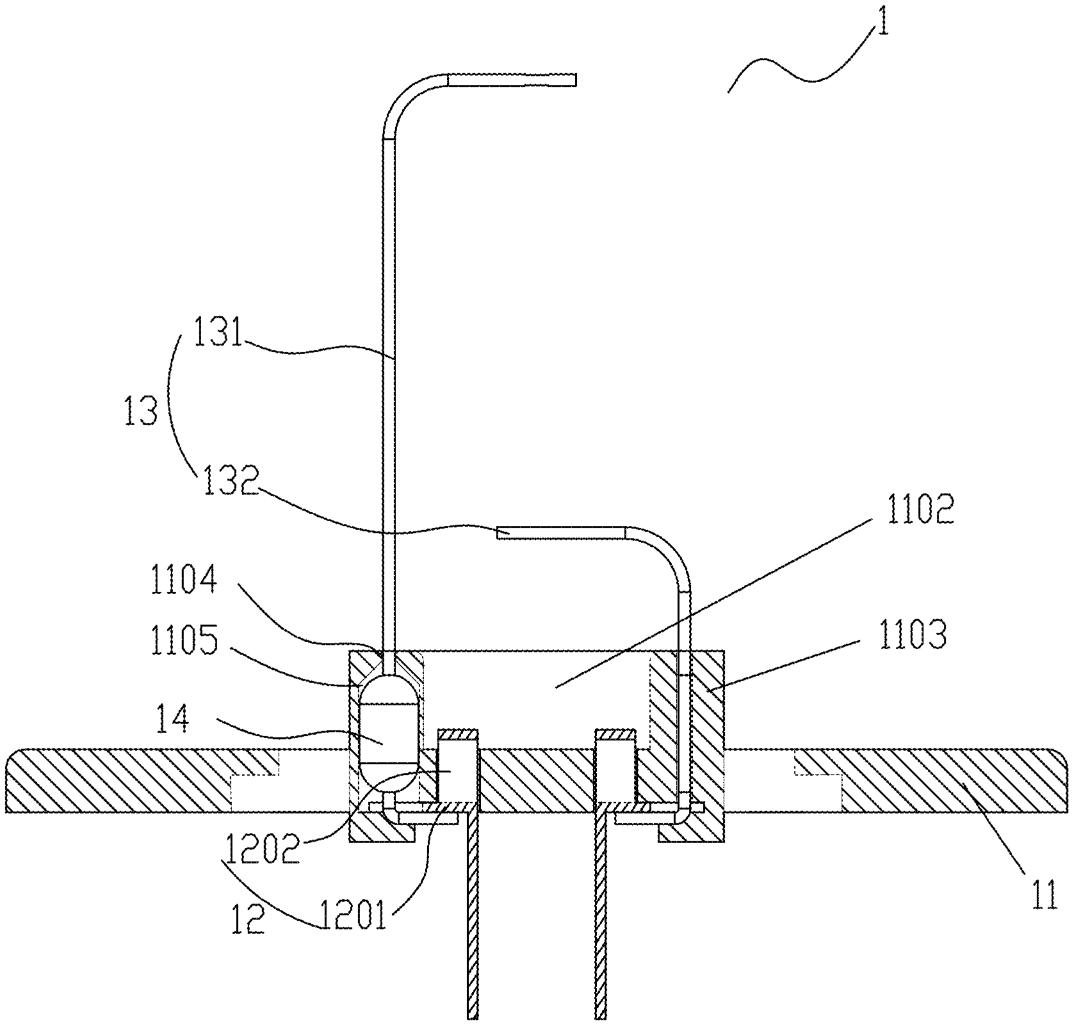
FIG. 1 is a cross-sectional view of the base of the present invention.
Figure 2:
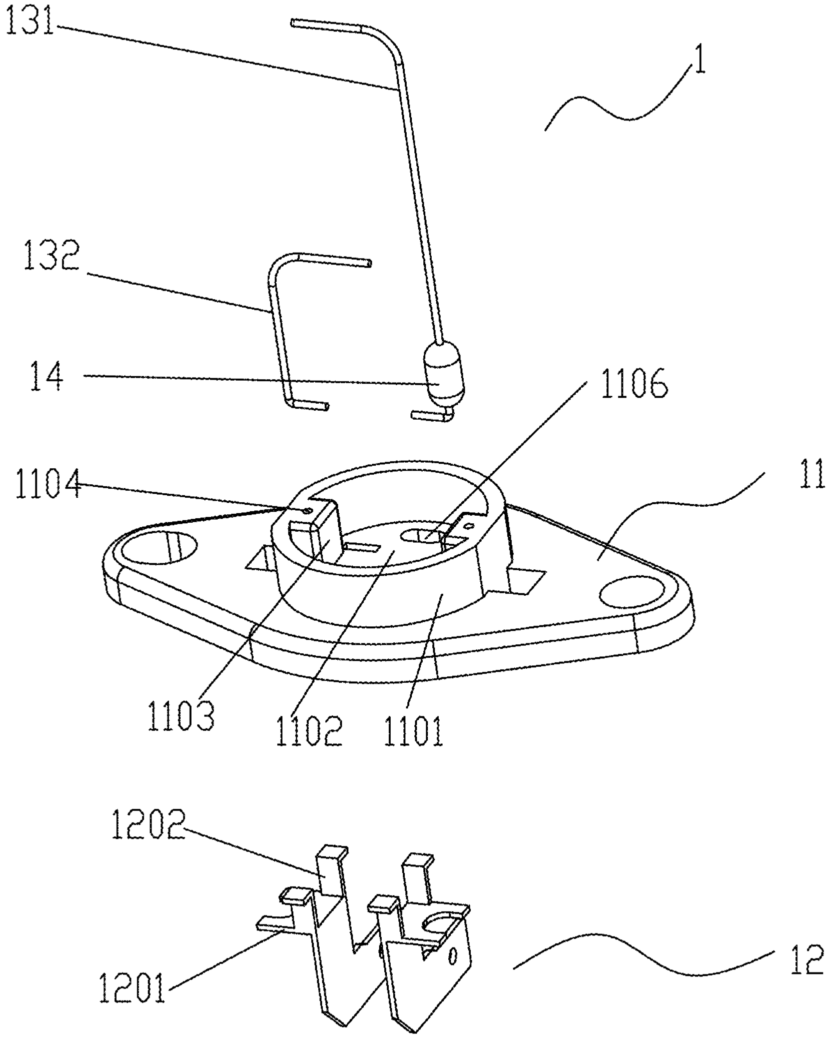
FIG. 2 is an exploded view of the base of the present invention.
Figure 3:
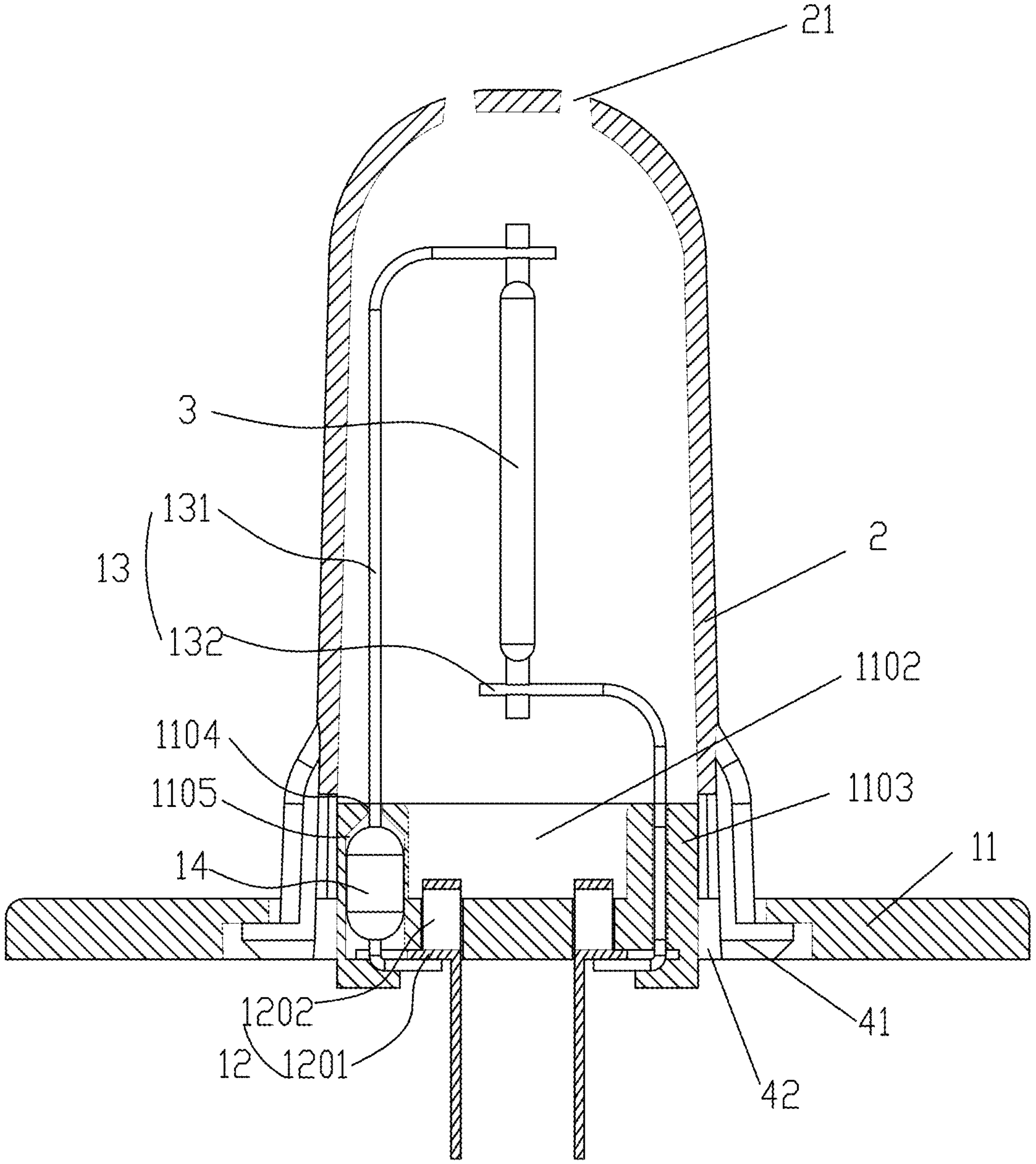
FIG. 3 is a first cross-sectional view of the LED light of the present invention.

As shown in FIG. 1 through FIG. 3, the first embodiment provides an LED light for microwave ovens, comprising a base 1, an LED light strip 3 electrically connected to the base 1, and a light housing 2 connected to the base 1. The base 1 includes a main body 11 and a pair of contact plates 12 on the main body 11 for connecting an external power source. The contact plates 12 each have a connecting portion 1201. The connecting portion 1201 is attached to the outer surface of the main body 11. The contact plate 12 may be secured to the main body 11 by adhesive bonding, riveting, etc. Preferably, as shown in FIG. 2, the contact plates 12 further have retaining legs 1202 which are four strip-shaped pieces extending from the connecting portions 1201 of the contact plates 12. The strip-shaped pieces are bent to attach to the inner surface of the main body 11 after passing through the main body 11, thereby forming multiple fixed points. This enhances the secure attachment to the main body 11 and facilitates automated installation of the contact plates 12.

The main body 11 has two guide holes 1104 passing through the main body 11. Each of the guide holes 1104 is provided with a wire 13. One end of the wire 13 is electrically connected to the connecting portion 1201. The other end of the wire 13 extends out of the main body 11 and extends outward to form a bracket. At least one of the guide holes 1104 is enlarged either entirely or at one end thereof to form an accommodating cavity 1105. A resistor 14 is provided in the accommodating cavity 1105. The depth of the accommodating cavity 1105 is not less than the length of the resistor 14. After being embedded in the accommodating cavity 1105, the resistor 14 is accommodated and confined within the accommodating cavity 1105. The resistor 14 is connected in series to the wire 13 that passes through the accommodating cavity 1105.

Based on the above solution, the accommodating cavity 1105 and the resistor 14 include multiple configurations:

Referring to FIG. 1 through FIG. 4, any one of the guide holes 1104 is enlarged either entirely or at one end thereof to form the accommodating cavity 1105. The wire 13 passing through the accommodating cavity 1105 is connected in series with a resistor 14 that matches the accommodating cavity 1105, forming a bracket with a single current-limiting function.

Figure 5:
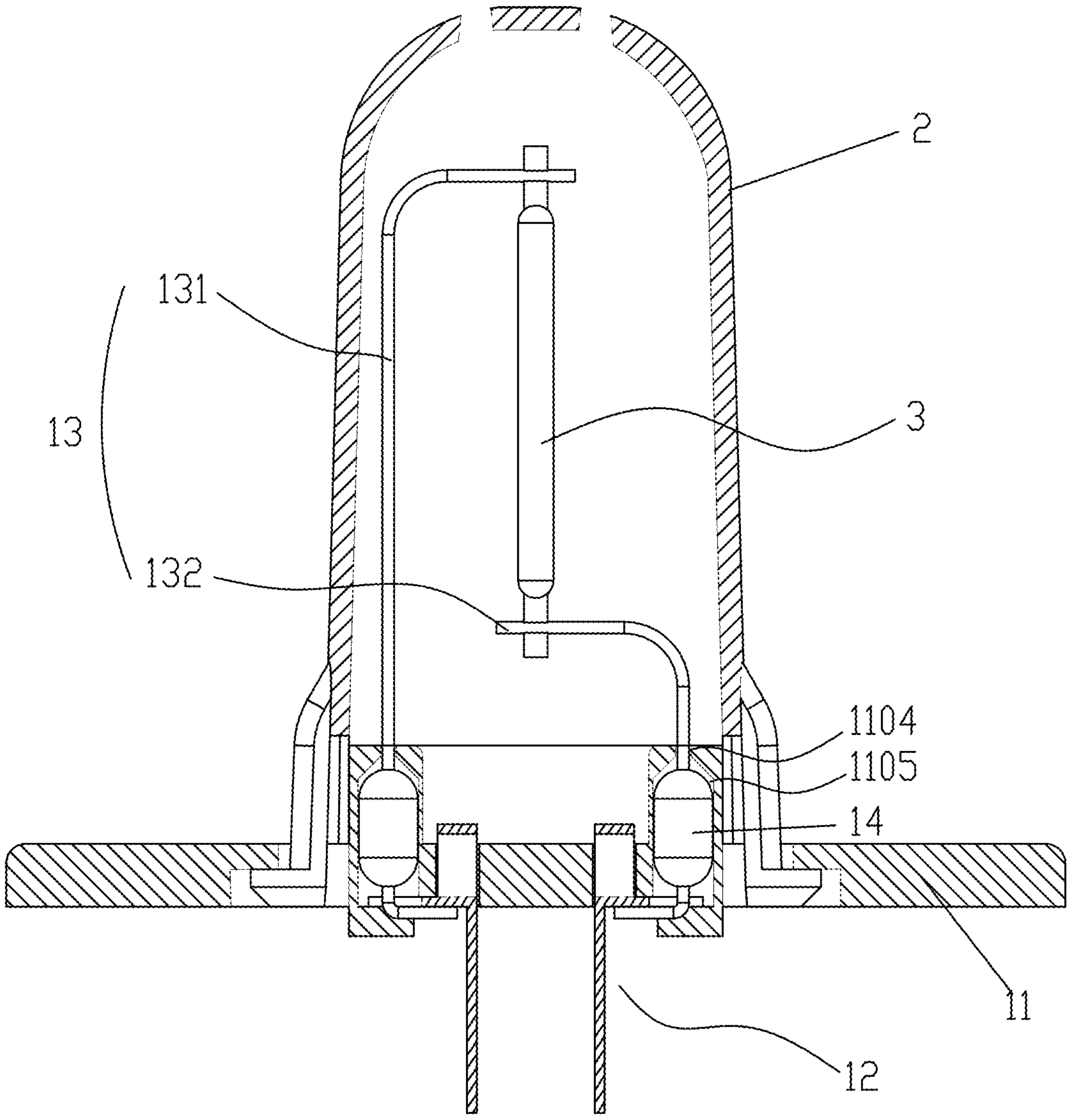
FIG. 5 is a third cross-sectional view of the LED light of the present invention.

Referring to FIG. 5, each of the two guide holes 1104 is enlarged either entirely or at one end thereof to form the accommodating cavity 1105. The two wires 13 are each connected in series with a resistor 14 that matches the accommodating cavity 1105, forming a bracket with a dual current-limiting function.

The accommodating cavity 1105 may be formed by enlarging the guide hole 1104 along the entire length. At this time, the accommodating cavity 1105 fits the resistor 14 to form a restriction to prevent the resistor 14 from falling out. The accommodating cavity 1105 may be formed by enlarging one end of the guide hole 1104, and the other end that is not enlarged is configured for insertion of the wire 13, thereby securing the wire 13. The resistor 14 is positioned by connecting the wire 13 to the connecting portion 1201 and being fit with the accommodating cavity 1105.

Preferably, as shown in FIG. 1, the accommodating cavity 1105 is formed by enlarging only one end of the guide hole 1104, close to the connecting portion 1201. The other end of the guide hole 1104, not being enlarged, is configured for insertion of the wire 13. The resistor 14 is confined and secured in the accommodating cavity 1105. After the LED light is assembled, the accommodating cavity 1105 is isolated from a light housing 2, ensuring that heat generated by the resistor 14 does not affect the temperature rise in the light housing 2. Preferably, the end of the resistor 14 is attached to the connecting portion 1201 to minimize the length of the wire connecting the resistor 14 to the connecting portion 1201, thereby shortening the total length of the wire 13 at both ends of the resistor 14. Specifically, the wire 13 is bent from the end close to the resistor 14 and fits the connecting portion 1201 and then fixed by spot welding, soldering, etc. to form an electrical connection. The guide hole 1104 is in transition fit with the wire 13, that is, the gap between the wire 13 and the guide hole 1104 is minimized to ensure the convenience of assembly. By limiting the gap, the absorption of microwave interference by the long wire 13 forming the bracket is reduced, thereby decreasing the inductive effect of the resistor 14 and maintaining its stable current-limiting function.

Furthermore, as shown in FIG. 2, one side of the main body 11, facing away from the contact plates 12, has an annular boss 1101. A cavity 1102 is formed inside the annular boss 1101. A raised block 1103 is provided in the cavity 1102 and connected to the main body 11. The guide hole 1104 passes through the main body 11 and the raised block 1103, thereby extending the length of the guide hole 1104, without increasing the thickness of the main body 11 of the base 1. When the LED light is assembled, the annular boss 1101 facilitates the connection and guidance between the light housing 2 and the main body 11 of the base 1, further improving the convenience of assembly.

Second Embodiment

Figure 4:
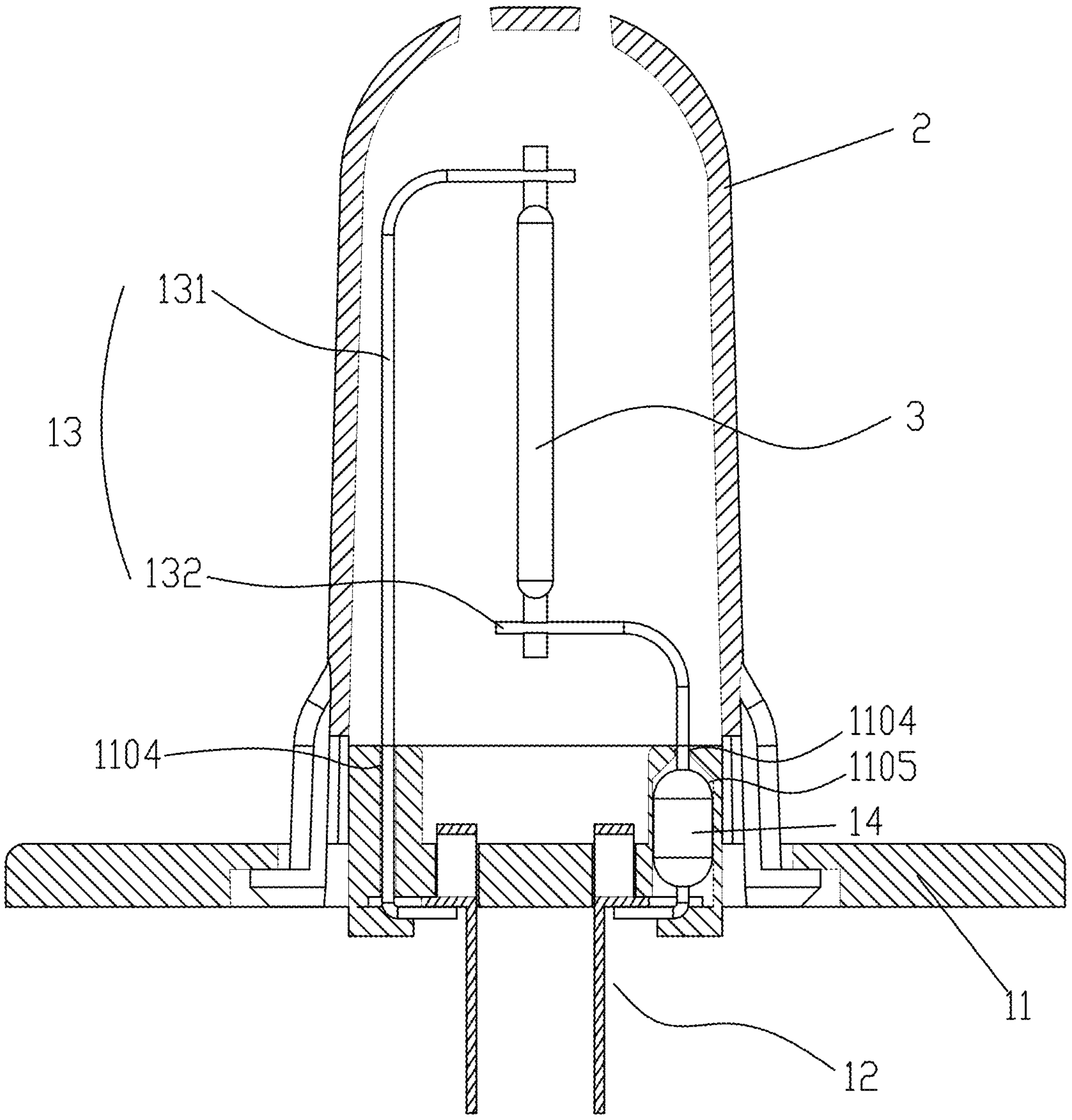
FIG. 4 is a second cross-sectional view of the LED light of the present invention.

As shown in FIG. 3 through FIG. 5, this embodiment provides an LED light for microwave ovens, assembling a light housing 2 and an LED light strip 3 on the basis of an LED light base 1 for microwave ovens according to any one of the implementations in the first embodiment. The LED light strip 3 may consist of a single filament or be formed by multiple filaments connected in series or parallel. The wires are electrically connected to both ends of the filaments after being connected in series or parallel. This embodiment is described by taking the LED light strip 3 composed of a single filament as an example. For ease of description and understanding, the LED light strip 3 is arranged along the length of the light housing 2. The wire 13 electrically connected to the distal end of the LED light strip 3 is defined as a first wire 131. The wire 13 electrically connected to the proximal end of the LED light strip 3 is defined as a second wire 132.

Depending on the structure of the base 1, the LED light of this embodiment may be in various structures:

As shown in FIG. 3, the first wire 131 is connected in series with the resistor 14, and the second wire 132 does not have the resistor 14 connected in series. Accordingly, the guide hole 1104 for the first wire 131 to pass through is enlarged at one end close to the connecting portion 1201 to form an accommodating cavity 1105. The resistor 14 connected in series with the first wire 131 is accommodated and confined in the corresponding accommodating cavity 1105. The guide hole 1104 for the second wire 132 to pass through is directly formed in the main body 11 of the base 1.

As shown in FIG. 4, the first wire 131 does not have the resistor 14 connected in series, and the second wire 132 is connected in series with the resistor 14. Accordingly, the guide hole 1104 for the first wire 131 to pass through is directly formed in the main body 11 of the base 1. The guide hole 1104 for the second wire 132 to pass through is enlarged at one end close to the connecting portion 1201 to form an accommodating cavity 1105. The resistor 14 connected in series with the second wire 132 is accommodated and confined in the corresponding accommodating cavity 1105.

As shown in FIG. 5, the first wire 131 and the second wire 132 are each connected in series with the resistor 14. Accordingly, one end of the guide hole 1104, close to the connecting portion 1201, is enlarged to form an accommodating cavity 1105 for accommodating and confining the resistor 14 connected in series with the first wire 131 and the second wire 132. This structure enhances the connection stability of the LED light strip 3 while expanding the adjustable range of the total resistance value of the resistor 14. It accommodates varying external input voltages or different installation space dimensions, thereby providing greater design flexibility for both the LED light strip 3 and the base 1.

Figure 6:
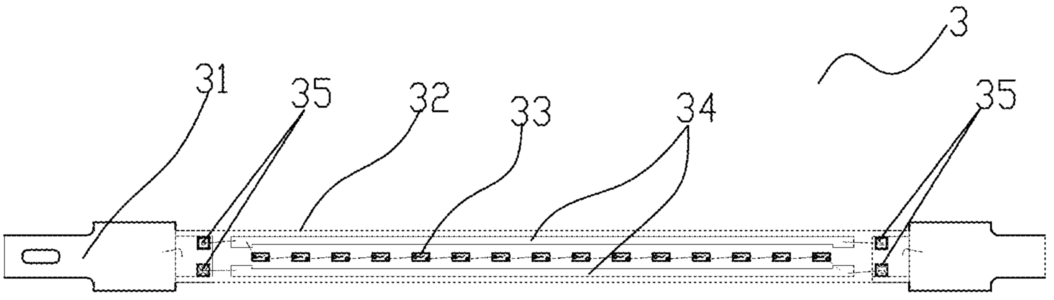
FIG. 6 is a schematic view of the LED light strip of the present invention.

Furthermore, in the aforementioned solution, the LED light strip 3 is any LED light strip that can be directly driven by AC. As a feasible implementation structure, as shown in FIG. 6, the LED light strip 3 includes connecting terminals 31 at two ends thereof and a substrate 32. The substrate 32 is provided with two conductive wires 34 connecting light-emitting chips 33. Two ends of each of the two conductive wires 34 are connected to the connecting terminals 31 through rectifier diodes 35. The rectifier diodes 35 at the two ends of the same conductive wire 34 are arranged reversely. The rectifier diodes 35 connected to the same connecting terminal 31 are arranged reversely. Specifically, when the rectifier diodes 35 are mounted on the substrate 32, the rectifier diodes 35 oriented in the same direction and connected at the two ends of the same conductive wire 34 form a connection circuit with one connected path and one disconnected path. A positive rectifier diode 35 and a negative rectifier diode 35 that are arranged reversely are connected to the same connecting terminal 31. By utilizing the conductive wires 34 and the unidirectional overcurrent characteristic of the rectifier diodes 35, a bidirectional overcurrent luminous circuit is formed, which can be directly connected to the AC without the need for an additional drive device, effectively simplifying the structure inside the light housing 2 and further simplifying the assembly process.

Furthermore, the light housing 2 is secured to the base 1 by means of threaded connection or snap-fit connection. Possible implementations are described below.

As shown in FIG. 3, the open end of the light housing 2 has at least two protruding elastic latches 41, and the base 1 has corresponding locking holes 42. The elastic latches 41 are inserted into the locking holes 42, such that the light housing 2 is secured to the base 1.

Figure 7A:
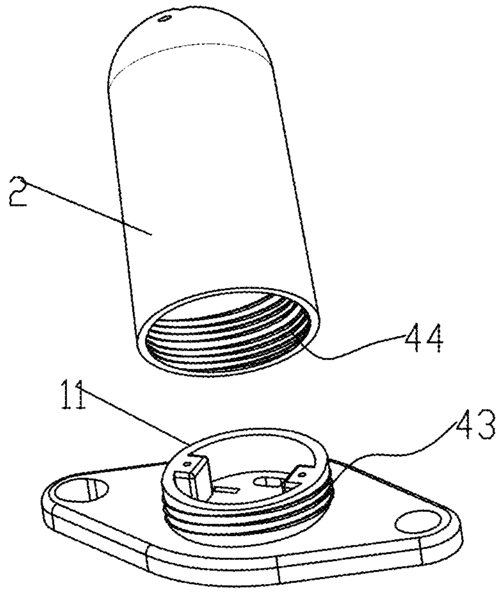
FIG. 7A is a schematic view of an implementation of the connecting structure of the light housing and the base of the present invention.

As shown in FIG. 7A, the annular boss 1101 has an external thread 43, and the light housing 2 has an internal thread 44. The light housing 2 is threadedly connected to the annular boss 1101 through the external thread 43 and the internal thread 44.

Figure 7B:
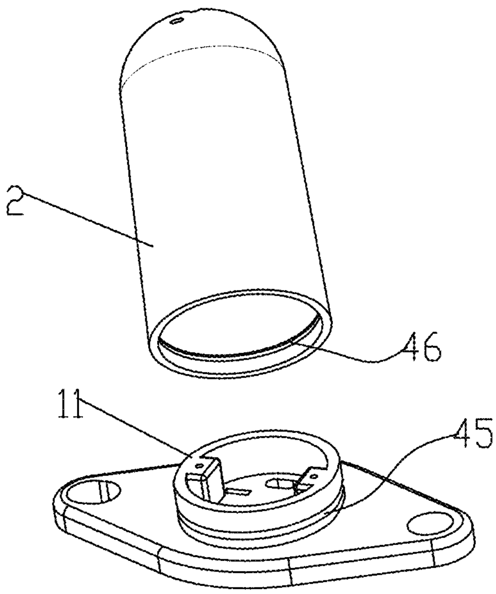
FIG. 7B is a schematic view of another implementation of the connecting structure of the light housing and the base of the present invention.

As shown in FIG. 7B, the outer wall of the annular boss 1101 has an annular groove 45, and the inner wall of the light housing 2 has a protruding ring 46. The light housing 2 and the annular boss 1101 are interlocked with each other through the annular groove 45 and the protruding ring 46.

Preferably, as shown in FIG. 2, the main body 11 of the base 1 is formed with a plurality of first heat dissipation holes 1106. As shown in FIG. 3 through FIG. 5, the top of the light housing 2 is formed with a plurality of second heat dissipation holes 21. When the temperature inside the light housing 2 rises, convection can be formed inside the light housing 2 through the first heat dissipation holes 1106 and the second heat dissipation holes 21, thereby accelerating heat dissipation.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED light for microwave ovens, comprising a base, an LED light strip electrically connected to the base and a light housing connected to the base, the base including a main body and a pair of contact plates on the main body for connecting an external power source, the contact plates each having a connecting portion attached to an outer surface of the main body, the main body having two guide holes passing through the main body, each of the guide holes being provided with a wire, one end of the wire being electrically connected to the connecting portion, another end of the wire extending out of the main body and extending outward to form a bracket, at least one of the guide holes being enlarged either entirely or at one end thereof to form an accommodating cavity, a resistor being provided in the accommodating cavity, the resistor being accommodated and confined within the accommodating cavity, the resistor being connected in series to the wire passing through the accommodating cavity.

2. The LED light as claimed in claim 1, wherein each of the two guide holes is enlarged either entirely or at the end thereof to form the accommodating cavity, and the resistor is disposed in the accommodating cavity and connected in series to the wire.

3. The LED light as claimed in claim 2, wherein the accommodating cavity is formed by enlarging the end of the guide hole, close to the connecting portion, and another end of the guide hole is configured for insertion of the wire.

4. The LED light as claimed in claim 3, wherein one end of the resistor is attached to the connecting portion, and the guide hole is in transition fit with the wire.

5. The LED light as claimed in claim 1, wherein the accommodating cavity is formed by enlarging the end of the guide hole, close to the connecting portion, and another end of the guide hole is configured for insertion of the wire.

6. The LED light as claimed in claim 5, wherein one end of the resistor is attached to the connecting portion, and the guide hole is in transition fit with the wire.

7. The LED light as claimed in claim 1, wherein one side of the main body, facing away from the contact plates, has an annular boss, a cavity is formed inside the annular boss, a raised block is provided in the cavity and connected to the main body, and the guide hole passes through the main body and the raised block.

8. The LED light as claimed in claim 1, wherein the contact plates further have retaining legs which are four strip-shaped pieces extending from the connecting portions of the contact plates, and the strip-shaped pieces are bent to attach to an inner surface of the main body after passing through the main body.

9. The LED light as claimed in claim 1, wherein the LED light strip is driven by alternating current (AC), the LED light strip includes connecting terminals at the two ends of the LED light strip and a substrate, the substrate is provided with two conductive wires connecting light-emitting chips, two ends of each of the two conductive wires are connected to the connecting terminals through rectifier diodes, the rectifier diodes at the two ends of the same conductive wire are arranged reversely, and the rectifier diodes connected to the same connecting terminal are arranged reversely.

10. The LED light as claimed in claim 1, wherein the light housing is secured to the base by means of threaded connection or snap-fit connection.

11. The LED light as claimed in claim 1, wherein the main body of the base is formed with a plurality of first heat dissipation holes, and a top of the light housing is formed with a plurality of second heat dissipation holes.

* * * * *